US012669211B2

(12) United States Patent
Girolmo

(10) Patent No.: US 12,669,211 B2
(45) Date of Patent: Jun. 30, 2026

(54) MOLDABLE GLASS WOOL TO PIPE INSULATION

(71) Applicant: JOHNS MANVILLE, Denver, CO (US)

(72) Inventor: Matthew Girolmo, Lakewood, CO (US)

(73) Assignee: Johns Manville, Denver, CO (US)

( * ) Notice: Subject to any disclaimer, the term of this patent is extended or adjusted under 35 U.S.C. 154(b) by 509 days.

(21) Appl. No.: 18/133,140

(22) Filed: Apr. 11, 2023

(65) Prior Publication Data

US 2024/0344647 A1     Oct. 17, 2024

(51) Int. Cl.
*F16L 59/02* (2006.01)
*F16L 59/14* (2006.01)

(52) U.S. Cl.
CPC .......... *F16L 59/028* (2013.01); *F16L 59/026* (2013.01); *F16L 59/029* (2013.01); *F16L 59/14* (2013.01)

(58) Field of Classification Search
CPC ..... F16L 59/028; F16L 59/026; F16L 59/029; F16L 59/14

USPC ........................................................ 138/140
See application file for complete search history.

(56) References Cited

U.S. PATENT DOCUMENTS

| | | | | |
|---|---|---|---|---|
| 2,778,759 A | * | 1/1957 | Stephens | B29C 67/248 |
| | | | | 138/147 |
| 2002/0066491 A1 | * | 6/2002 | Lively | F16L 59/143 |
| | | | | 138/146 |
| 2004/0079431 A1 | * | 4/2004 | Kissell | F16L 59/021 |
| | | | | 138/167 |
| 2005/0016665 A1 | * | 1/2005 | Hudson | H02K 15/105 |
| | | | | 156/190 |
| 2005/0166543 A1 | * | 8/2005 | Suda | B32B 17/02 |
| | | | | 52/745.19 |
| 2006/0141177 A1 | * | 6/2006 | Ligtenberg | B32B 5/022 |
| | | | | 428/34 |
| 2019/0063664 A1 | * | 2/2019 | Zwaag | C08K 7/04 |
| 2023/0017766 A1 | * | 1/2023 | Gawryla | B32B 5/02 |

* cited by examiner

*Primary Examiner* — David R Deal
(74) *Attorney, Agent, or Firm* — Robert D. Touslee

(57) ABSTRACT

A method of insulating a piping system. The method may comprise coupling an uncured insulation substrate to the piping system and setting the uncured insulation substrate to cure the uncured insulation substrate to a cured insulation substrate.

19 Claims, 4 Drawing Sheets

100

131 130 120 110

200

231 230 220 210

MOLDABLE GLASS WOOL TO PIPE INSULATION

BACKGROUND

Pipe insulation provides various thermal and acoustic insulation to pipe systems. Such insulation is important where, for example, pipe systems facilitate the transportation of hot water. Proper pipe insulation may minimize the amount of heat lost as the hot water flows through the pipe system, thus saving costs and minimizing energy use. However, in some instances, pipe systems may have complex shapes. For example, pipe systems may have a number of bends or angles along its length. Wrapping insulation around these bends and angles may prove challenging. Accordingly, it would be beneficial for an improved pipe insulation and methods of use thereof.

SUMMARY

One aspect of the disclosure provides for a method of insulating a piping system. The method may comprise coupling an uncured insulation substrate to the piping system and setting the uncured insulation substrate to cure the uncured insulation substrate to a cured insulation substrate. The method may further comprise securing the uncured substrate to the piping system with a securing element. The securing element may include one of a jacket, a zip tie, adhesive, wire tie, or tape. The securing element may be the jacket and the jacket may be secured to the insulation substrate with an additional securing element. The additional securing element may include one of a zip tie, adhesive, wire tie, or tape. Securing the jacket to the insulation substrate may include adhering an end of the jacket to a surface of the jacket. The jacket may include a corrugated geometry. Coupling the uncured insulation substrate to the piping system may include wrapping the uncured insulation substrate to the piping system. Coupling the uncured insulation substrate to the piping system may include adhering the uncured insulation substrate to the piping system. Setting the uncured insulation substrate may include setting the uncured insulation substrate at ambient conditions. The method may further comprise prior to coupling the insulation substrate to the piping system, peeling off a release layer from the insulation substrate.

Another aspect of the disclosure provides for a method of manufacturing insulation. The method may comprise forming a layer of glass fiber, depositing uncured binding element onto the layer of glass fiber to form an uncured insulation substrate, and coupling a jacket to the uncured insulation substrate to form an insulation system. The method may further comprise cutting the insulation system into one or more insulation system sections. The method may further comprise packaging the one or more insulation system sections into a packaged product. Packaging the one or more insulation system sections may include rolling the one or more insulation system sections into a roll. Packaging the one or more insulation system sections may include stacking the one or more insulation system sections into a stack. Coupling the jacket to the uncured insulation substrate may include pressing the jacket to the uncured insulation substrate. The method may further comprise coupling a release layer to the insulation system. The jacket may include a corrugated geometry.

Another aspect of the disclosure provides for an insulated piping system. The insulated piping system may comprise a piping system and an uncured insulation system coupled to the piping system. The uncured insulation system is curable at ambient conditions.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
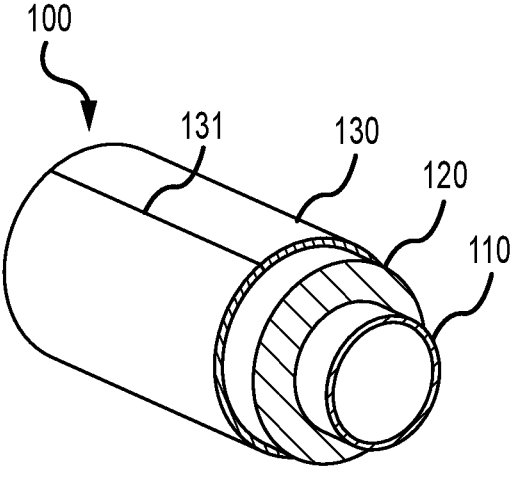
FIG. 1 illustrates an example insulation system coupled to a structure according to one embodiment of the disclosure.

The present disclosure is directed toward insulation for use in wrapping a pipe system. In some embodiments, the insulation may be a finished or cured insulation such that the insulation may be wrapped around the pipe system without any further processing. For example, the foam insulation may be extruded foam tubes or elastomeric rubber tubes with a slit such that the insulation may be wrapped around a pipe system by inserting the pipe system through the slit.

However, it may be difficult for such cured insulation to wrap around a complex piping system having a number of turns and bends as the insulation may be cured to retain a certain shape once the insulation is cured. In this example, to conform to a pipe system having complex geometry, the cured insulation may have to be separately cut to conform to each bend, leaving a number of gaps between each piece of insulation. Alternatively, the cured insulation may be twisted and bent to conform to the bends, which may result in certain sections of the insulation inadvertently spaced from the pipe system.

In other embodiments, a moldable insulation may be provided to wrap around a structure having a complex geometry (e.g., a pipe system having a number of bends). For example, the moldable insulation may be provided as a substrate in an uncured state. The substrate may be a composite of an insulative material (e.g., a fiberglass material) and a binding element. The substrate may be provided in an uncured state such that the substrate does not have a set geometry (such as when the substrate is cured) and may also have a certain level of tackiness. In this uncured state, the substrate may be wrapped about the structure to conform to the structure's shape. The tackiness of the substrate may allow for the substrate to maintain its position on the structure after being wrapped. Once the uncured substrate is wrapped around the structure, the substrate may be cured in place (e.g., after being wrapped around the structure) without any additional processing by the user. For example, the substrate may be cured over a period of time under the ambient conditions of the environment surrounding the structure.

This moldable insulation may be able to better conform to structures having complex geometries than insulation that is provided in a finished or cured state. While finished or cured insulation may be wrapped about a structure, such finished insulation is less malleable than moldable insulation (i.e., resists deformation from a set geometry in its cured state). As noted above, such a lack of malleability may limit the ability to securely and efficiently wrap the finished or cured insulation about a structure having a complex geometry. On the other hand, moldable insulation may wrap around a structure having any geometry while conforming to the shape of the structure. Such a custom fit may provide better insulation by increasing the contact area and decreasing void spaces between the insulation and the structure, thus saving energy costs by reducing thermal leakage. Further, as the moldable insulation is cured in place, the moldable insulation may not require further processing by the manufacturer to cure the insulation, thus saving manufacturing costs.

I. Exemplary Insulation System

FIG. 1 depicts a cross-sectional view of an exemplary insulation system 100 coupled to (e.g., wrapped around) a structure 110 (e.g., a pipe). The insulation system 100 may include an insulation substrate 120 and a jacket 130. The insulation substrate 120 may thermally and acoustically insulate the structure 110. The jacket 130 may be coupled to (e.g., wrapped around) the insulation component 120 to protect the insulation substrate 120 and assist in securing the insulation substrate 120 to the structure 110. Although the structure 110 is depicted as a cylindrical pipe (e.g., iron, copper, plastic, rubber, or the like), the structure 100 may have any other geometry. For example, the structure may have a cuboid shape, pyramidal shape, or have any other prismoid shape.

Although FIG. 1 depicts the insulation substrate 120 coupled to the structure 110 such that the insulation substrate 120 is fully wrapped around the structure 110, in other embodiments, the insulation substrate may be only partially wrapped around the structure, such as only along one or more sides of the structure. Further, in other embodiments, multiple pieces of the insulation substrate may be coupled to the structure.

Examples of materials for the insulation substrate 120 may include an insulating material (e.g., fiberglass based materials made of an inorganic material, such as woven or non-woven fibers) adhered together with a binding element (e.g., a thermosetting binder or resin). The fibers may include one or more fibers such as glass fibers, carbon fibers, mineral fibers, stone wool fibers, organic polymer fibers, among other kinds for fibers. In embodiments, the fibers may make up about 50 wt. % to about 99.5 wt. % of the fiberglass-containing products. Additional exemplary fiber weight ranges include about 90 wt. % to about 99 wt. %; and about 75 wt. % to about 95 wt %.

In other embodiments, the insulation substrate 120 may include polymer or polymeric materials, such as fibers or membranes. For example, the insulation substrate 120 may include high-density polymer or predominantly polymer materials, such as: a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with inorganic filler(s) or a high-density material made of a blend of these materials with filler(s); a high-density predominantly polyisocyanurate, polyurethane, polystyrene, or phenolic foam material with inorganic filler(s) or a high-density foam material made of a blend of these materials with filler(s), a high-density material made of other thermoset matrix polymers; or the like. Where the insulation substrate 120 includes a polymer material, the insulation substrate 120 may contain various powdered and liquid fillers, fiber reinforcements, fungi growth-inhibiting agents, and fire-retardants to reduce the cost of and/or modify the properties of the insulation substrate 120. Examples of fillers may include limestone (CaCO3), fiberglass, recycled polyisocyanurate dust, and extenders/plasticizers.

In other embodiments, the insulation substrate 120 may be made of polymeric membranes, such as various synthetic rubber materials, modified bitumen, or thermoplastic materials. For example, the polymeric membranes may include thermoplastic polyolefin (TPO), polyvinyl chloride (PVC), ethylene propylene diene monomer (EPDM), chlorinated polyethylene (CPA), and/or modified bitumen, although some embodiments may use other thermoset and/or thermoplastic membranes. In some embodiments, the polymeric membrane may include one or more polymers blended with one or more fillers. For example, in some embodiments polymeric membranes may include some combination of the following materials: polypropylene, polyethylene, block copolymer polypropylene, rubber, plasticizers, fiberglass, carbon fiber, fire retardants, and the like. In another embodiment, polymeric membranes may be a pure polymer blend without or with very few fillers. For example, the polymeric membrane may include mainly polypropylene or polyethylene or some combination of these polymers with little to no fillers, although in some embodiments, these polymeric membranes may include some amount of a filler, such as a fire retardant.

The insulating material of the insulation substrate 120 may be bound together with a binding element. This binding element may be a cohesive or an adhesive binder. The adhesive may be a hot melt adhesive that includes include between about 50% and 90% of a 100% cured acrylic high molecular weight hot melt adhesive with 0% to 20% rosin or terpene resin tackifier and 0% to 15% of curatives. The molecular weight of the resin may range be between about 100,000 MV/g/mol and 600,000 MV/g/mol. In some embodiments, the adhesive may be a pressure sensitive adhesive that includes 50% to 75% styrene butadiene rubber, between 0% and 20% neoprene, between 5% and 15% of a tackifier, and between 0% and 15% of curatives. Where the adhesive is a UV curable adhesive, such as a UV curable acrylic adhesive, the adhesive may be fully cured during manufacturing and/or may be partially cured. In embodiments in which the UV curable adhesive is only partially cured, the UV curable adhesive may be fully cured after installation by exposure to a UV light source, such as a UV lamp and/or natural UV light (sunlight). The UV curable adhesive may include between about may include between about 45% and 80% of a UV cross-linkable acrylic resin, between about 20% and 40% of a tackifier resin, and between about 0% and 15% of a photo-initiator and/or polymerizer.

The binding element may include an effective amount of a water repellant to limit the intrusion of aqueous matter after the binding element is set. For example, vinyl acrylate latex copolymers may further incorporate stearylated melamine for improvement in water repellency. Exemplary concentrations of the stearylated melamine may include about 3 wt. % to 10 wt. %, (e.g., about 6 wt. %). The stearylated melamine may be in liquid form having a solids content of about 40 wt. percent and is mixed with a suitable copolymer latex and water to prepare the binding element. In other embodiments, the binding element may include a silicone material (e.g., reactive silicone) to improve its water repellency. This material mixture may have a pH of about 9, a viscosity of about 45 centipoises and be anionic.

The binder may be a cohesive binder. Examples of a cohesive binder may include, for example, formaldehyde-containing binder compositions. Such compositions may include phenol-formaldehyde (PF) binder compositions, phenol-urea-formaldehyde (PUF) binder compositions, urea-formaldehyde (UF) binder compositions, and melamine-formaldehyde (MF) binder compositions, among other formaldehyde-containing binder compositions. For example, the binder may be a urea formaldehyde composition including between about 50-90% resin, 0-20% urea, and 0-30% other additives. One example binder composition may include between about 5-20% urea, 20-30% ammonia, and 10-20% ammonia sulfate/silane. This example may include a resin having a flow rate between about 0.4-1.16 gallons per minute. In embodiments, PF binder compositions may include resole binder compositions where the amount of formaldehyde (by mole) exceeds the amount of phenol. Phenol-to-formaldehyde mole ratios in these resole binder compositions range from 1:1 to 1:5 (e.g., 1:1.2 to 1:4.5; 1:1.5 to 1:2.5; etc.). In further embodiments, the PF binder compositions are aqueous compositions characterized by a total solids concentration greater than or about 30 wt. %, greater than or about 40 wt. %, greater than or about 50 wt. %, greater than or about 60 wt. %, or more. Other example binding elements may be described in: U.S. patent application Ser. No. 17/318,430 entitled "Formaldehyde-Containing Products With Reduced Formaldehyde Emissions"; U.S. patent application Ser. No. 11/075,201 entitled "Fiberglass Binder Utilizing a Curable Acrylate and/or Methacrylate," issued as U.S. Pat. No. 7,321,010; and U.S. patent application Ser. No. 17/324,232 entitled "Double Pass Process of Making a Self Adhering Roofing Membrane With Improved Adhesion at Lower Installation Temperature"; U.S. patent application Ser. No. 16/546,448 entitled "Urea-Glyoxal Crosslinking Compounds For Phenolic Binder Compositions." Each of these disclosures are incorporated by reference herein in their entirety.

The binding element may be an ambient binding element that is curable in the ambient conditions of the environment of the structure 110. Specifically, the binding element may cure as water evaporates from the binding element and the binding element polymerizes the network of fibers together. The binding element may be cured as a function of temperature, humidity, loss on ignition, thickness of the insulation substrate 120, and catalyst level of the binding element. In some examples, this ambient binding element may be an adhesive resin. For example, the binding element may be cured at temperatures between about 60-90° F. and humidity levels of 30-50% humidity. At these ambient conditions, the binding element may require between about 2-4 hours to be cured (e.g., to have between about 20% or more LOI). Different conditions may alter the curing time for the binding element. For example, more humidity and/or a lower temperature may increase the time to cure the binding element. In one example, the binding element may cure under a testing condition. Specifically, the binding element may have a 20% LOI at 210° C. over four minutes.

Accordingly, the insulation substrate 120 may be coupled about a structure and left at ambient conditions for a set period of time without any additional input required by a user or manufacturer. For example, the insulation substrate 120 may be cured at the ambient conditions without applying additional pressure and heat to the insulation substrate 120. However, in other embodiments, additional pressure may be applied to the insulation substrate to more expeditiously cure the insulation substrate. As other insulation substrate may require an additional curing step prior to being provided to an end user, the ambient binding element may save manufacturing costs as the manufacturer may provide insulation substrate 120 to the end user without curing the insulation substrate 120. However, in other embodiments, the ambient binding element may be cured by the manufacturer before providing the insulation substrate 120 to the end user.

The insulation substrate 120 may be provided in any workable size but is, preferably, available in sizes that can conform to at least some standard iron and copper pipe sizes. The insulation substrate 120 may be provided with various wall thicknesses, and a wall thickness may be selected for a particular application based on such variables as the temperature of the fluid in the structure being insulated, the thermal conductivity of the insulation material, the maximum allowable temperature of the outside surface of the insulation, the diameter of the pipe being insulated, the cost of the insulation and its installation, the cost of heating or cooling the fluid in the pipe being insulated, or other factors. In some embodiments, the insulation product may be circularly cylindrical, with an inner diameter of between about 0.5 and 24 inches and a wall thickness between 0.5 and 6 inches, although other sizes are possible. For example, the insulation product may have an inner diameter between about 0.4 and 30 inches, between about 1 and 20 inches, or between about 5 and 10 inches. The wall thickness may be between about 0.4 and 10 inches, between about 1 and 8 inches, or between about 3 and 6 inches.

Other properties of the insulation substrate 120 may be selected as needed. For example, the insulating material in the insulation substrate 120 may have a bulk density of between 1 and 20 lb/ft$^3$, preferably between 2 and 10 lb/ft$^3$, and more preferably between 3 and 7.5 lb/ft$^3$.

In some embodiments, the ambient binding element may be tacky in an uncured state such that the insulation substrate 120 may be adhered to the structure 110 and maintain its position on the structure 110 without additional securing elements. In this manner, the insulation substrate 120 may be securely coupled to the structure and be left to cure on the structure 110 without further installation steps, thus saving costs associated with installing insulation substrate 120. The insulation substrate 120 may be considered tacky where the insulation substrate 120 would not simply slide off the structure 110 when coupled to the structure 110 free of any non-gravitational force applied to the insulation substrate 120. Specifically, the insulation substrate 120 may be considered tacky where the insulation substrate 120 has a coupling force (e.g., an adhesion force) to the structure 110 of about 15.36 lbf. In some embodiments, the insulation substrate 120 may have a coupling force when uncured of between about 10-20 lbf, 12-18 lbf, 14-16 lbf, or about 15 lbf. Further, the insulation substrate 120 may be considered tacky when uncured when the insulation substrate 120 has a coupling force of about 2.66 lb/in$^2$. In some embodiments, the insulation substrate 120 may have a coupling force when uncured of between about 1.5-3.5 lb/in$^2$, 1.75-3.25 lb/in$^2$, 2-3 lb/in$^2$, or about 2.5 lb/in$^2$.

The tackiness of the insulation substrate 120 may increase as the insulation substrate 120 is cured. Accordingly, attempting to decouple the insulation substrate 110 from the structure 110 in a cured state would be more difficult than decoupling the uncured insulation substrate 120 from the structure 110. Specifically, the cured insulation substrate 120 may have a coupling force to the structure 110 greater than the coupling force when the insulation substrate 120 is in an uncured state.

Additionally, the insulation substrate 120 in an uncured state may be malleable such that the shape of the insulation substrate 120 may be adjusted to conform to the structure 110. Where the structure 110 includes a complex geometry (e.g., bends or the like), as will be discussed further below, the uncured insulation substrate 120 may conform to those bends to efficiently provide insulation to complex geometry.

The jacket 130 may be coupled over the insulation substrate 120 such that the insulation substrate 120 is disposed between the jacket 130 and the structure 110. The jacket 130 may be coupled to the insulation substrate 120 such that the jacket 130 wraps around, and is coextensive with, the insulation substrate 120. However, in other embodiments, the jacket may only partially wrap around the insulation substrate, such as only wrapping a portion or side of the insulation substrate. Further, a singular piece of the jacket 130 may be coupled to the insulation substrate 120 to cover the outer circumference of the structure 120, however, in other embodiments, multiple pieces of the jacket may be coupled to the insulation substrate.

The jacket 130 may be provided to protect the insulation substrate 120 from the surrounding elements. Accordingly, the jacket 130 may be a water-impermeable material. The jacket 130 may include one or more layers of material. For example, the jacket 130 material may include a foil (e.g., an aluminum foil or foil scrim kraft). Alternatively or additionally, the jacket 130 material may include metallized polyethylene terphthalate (MPET). Either of these materials provide a substantially impermeable fluid vapor barrier to fluids that are external to and surrounding the insulation substrate 120, thus protecting the insulation substrate 120 from outside water condensation, corrosion, loss of insulating value, mold growth, etc. Specifically, the use of either a foil (e.g., aluminum foil) or a metallized polymeric jacket 130 (e.g., MPET) may be water-impermeable when the jacket 130 provides a water vapor transmission rate of less than 0.02 perms.

Such materials additionally provide protection to the structure 110. By using the foil or metallized polymeric jacket 130, fluid vapor (e.g., water vapor) in the surrounding environment may be restricted (or kept) from penetrating through the jacket 130 to the structure 110. Where cold fluid is passed through the structure 110, the foil or metallized polymeric jacket 130 prevents water vapor from condensing on the pipes and corroding or degrading the structure 110, staining the insulation substrate 120 or other surrounding objects, dripping onto a surface and causing damage, causing mold or fungal growth, etc.

The jacket 130 may further include a porous media layer, such as a kraft paper sheet that is between about 35 and 55 pounds/3000 square feet and that may include one or more additives to enhance the performance of the jacket 130. For example, the porous media may include one or more fire retardant additives and/or anti-microbial agents to prevent mold or fungal growth and to prevent propagation of smoke and/or fire. The porous nature of the porous media may facilitate in absorbing and retaining the one or more additives within the porous media, and hence, within the laminate. For ease of description, the porous media may include kraft paper, although it should be understood that various types of porous media may be used (e.g., fiberglass mat, synthetic mat, paper, etc.). The various layers of the jacket 130 may be bonded or adhered using one or more adhesives as described below. In other embodiments, there may be any combination of material layers as described above, including only using one layer. Other example materials for an outer protection layer for insulation may be described in U.S. Pat. No. 9,376,814 entitled "Systems and Methods for Insulating a Pipe," the entirety of which is incorporated herein.

However, in other embodiments, other materials may be used. For example, the jacket 130 may include one or more flame retardants or fungi growth inhibiting agents. The jacket 130 may include cross-linked polyethylene (PEX) and/or fiberglass reinforcing yarn. In other embodiments, the jacket may be any other material providing protection and/or water-impermeability to the insulation substrate.

The layers of the jacket 130 may have any thickness to provide protection to the insulation substrate 120, as desired. For example, the foil layer may include an aluminum foil between about 0.00025 inches and about 0.001 inches in thickness (between about 0.25 mils and about 1 mil in thickness) and/or the metallized polymeric layer may between about 0.48 mils and about 1 mils in thickness (between about 48 and 100 gauge in thickness). In other embodiments, the aluminum foil may be between about 0.0002 inches and 0.002 inches, between about 0.0005 inches and 0.001 inches, or between about 0.00075 inches and about 0.0009 inches. The metallized polymeric layer may have a thickness between about 0.4 and 1 mils, between about 0.6 and 0.8 mils, or about 0.7 mils.

The jacket 130 may have enough rigidity to provide protection to the insulation substrate 120 from external debris or the like. Additionally, the jacket 130 may have sufficient rigidity to resist deforming from a set geometry. In this manner, where the jacket 130 is manufactured to have a substantially cylindrical shape, the jacket 130 may resist minor deformation such that the jacket 130 will return to its original cylindrical shape. However, the jacket 130 may additionally be malleable enough that the jacket 130 may be manipulated to wrap around the insulation substrate 120.

For example, the jacket 130 may be manipulated to open along a slit 131 to wrap around the insulation substrate 120. At least one end of the jacket 130 may be adhered to a portion of the jacket 130 using, for example, a pressure sensitive adhesive layer to secure the jacket 130 to the insulation substrate 120. However, in other embodiments, the jacket may be secured to the insulation substrate using other securing elements, such as zip ties, adhesive, wire ties, tape, wrapping, or the like. In a yet further alternative, where the jacket is coupled to the insulation substrate in an uncured state, the jacket may be coupled to the insulation substrate through the tackiness of the uncured insulation substrate without any additional securing elements.

The jacket 130 may be provided to additionally maintain the insulation substrate 120 on the structure 110. As such, the position and shape of the insulation substrate 120 may be supported by the jacket 130 holding the inflation substrate 120 in place. However, in alternative embodiments, the tackiness of the insulation substrate in its uncured state may be sufficient to maintain the position and shape of the insulation substrate along the structure without a jacket. In a yet further alternative, the insulation substrate may be secured to the structure through other securing elements, such as zip ties, adhesive, wire ties, tape, wrapping, or the like.

Figure 2:
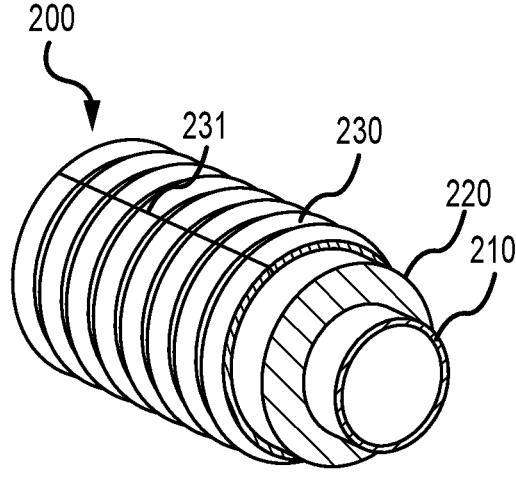
FIG. 2 illustrates an example insulation system coupled to a structure according to one embodiment of the disclosure.

Although the jacket 130 is depicted as having a smooth cylindrical shape, in other embodiments, the jacket may include other shapes. For example, FIG. 2 depicts an exemplary insulation system 200. It is understood that features ending in like reference numerals as features discussed above are similar, except as noted below. The jacket 230 may be cylindrical and have a corrugated geometry comprising multiple bends along the length of the jacket 230. This corrugated geometry may allow for the jacket 230 to be deformed to conform to various shapes. For example, as will be discussed further below, the corrugated geometry of the jacket 230 may allow the jacket 230 to conform to a piping system including complex geometry, such as bends or the like.

II. Exemplary Method of Installing an Insulation System

Figure 3A:
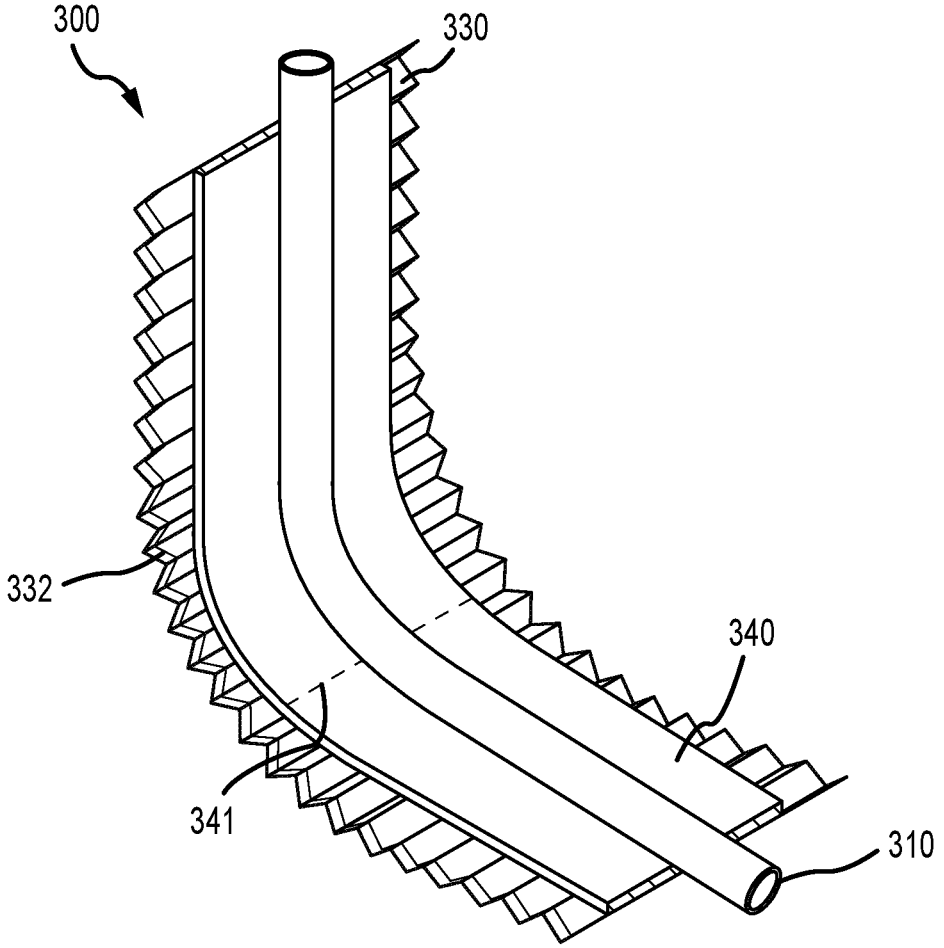
FIGS. 3A and 3B illustrate an example method of coupling an insulation system to a structure according to one embodiment of the disclosure.
Figure 3B:
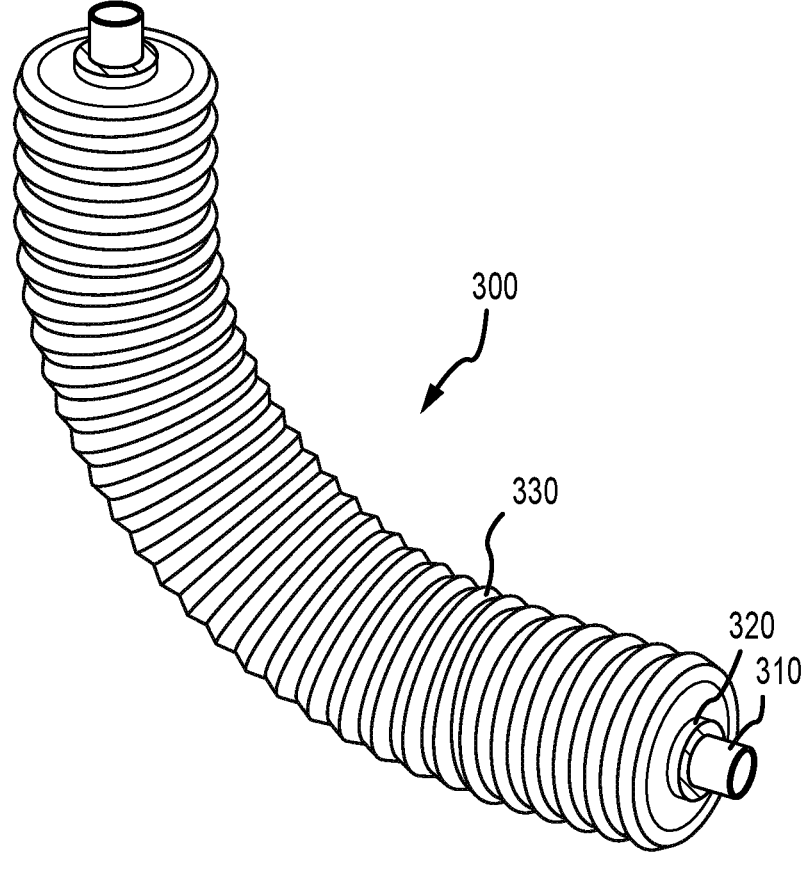

FIGS. 3A and 3B depict a method of installing an exemplary insulation system 300 to a structure 310. It is understood that features ending in like reference numerals as features discussed above are similar, except as noted below. As shown in FIG. 3A, the structure 310 includes a complex geometry (e.g., a bend along its length). The insulation substrate 320 is provided in an uncured state to couple to the structure 310. In some embodiments, the insulation substrate 320 may include a release layer 340 coupled to a surface of the insulation substrate 320. The release layer 340 may be releasably coupled to the insulation substrate 320 to prevent the insulation substrate 320 from unintentionally adhering to other objects. The surface of the release layer 340 in contact with the insulation substrate 320 may be treated with silicone or another suitable release agent to allow for the release layer 340 to be easily removable from the insulation substrate 320. In this example, the release layer 340 may be peeled off from the insulation substrate 320 prior to any further steps. However, in other embodiments, there may be no release layer coupled to the insulation substrate.

The release layer 340 may include a perforation line 341 defined along the release layer 340 extending at least across a portion of the release layer 340. The perforation line 341 may be a series of dots, slits, or the like defined through the release layer 340. The perforation line 341 may allow for sections of the release layer 330 to be more easily torn from each other. The perforations may be equal in in size and length or, in other embodiments, unequal. In some embodiments, the perforation lines may be a single cut along the release layer extending across substantially the entire release layer. In other embodiments, the perforation lines are not straight but, rather, curved, angled, or the like. Moreover, in other embodiments, there may be more than one perforation line (e.g., two, three, four, or the like). In other some embodiments, the perforation lines may extend the entire length and/or width of the release layer. However, in other embodiments, the perforation lines may extend only a portion of the release layer.

As noted above, because the insulation substrate 320 is in an uncured state, the insulation substrate 320 is tacky. As such, the insulation substrate 320 may be coupled to the structure 310 (e.g., wrapped around the structure 310) by contacting and adhering to the structure 310. Further, since the insulation substrate 320 is in an uncured state, the shape of the insulation substrate 320 may conform to the complex geometry of the structure 310. Whereas cured insulation substrates may be difficult to conform to such complex geometry as those substrates are cured to retain a certain shape, the uncured insulation substrate 320 may provide insulation to a variety of geometry.

In some embodiments, the adherence between the insulation substrate in its uncured state and the structure may be sufficient to maintain the position and shape of the insulation substrate on the structure. However, in other embodiments, additional support may be provided to support the insulation substrate 320 to assist in maintaining the position and shape of the insulation substrate 320 on the structure 310. Accordingly, the jacket 330 may be provided to couple to the structure 310. The jacket 330 includes a corrugated geometry to more easily conform to the complex geometry of the structure 310. However, in other embodiments, the jacket may include other geometry, such as being substantially smooth or the like.

The jacket 330 includes a securement area 332 along an end of the jacket 330. The securement area 332 may be a pressure sensitive adhesive, as discussed above, such that the securement area 332 may be pressed against an outer surface of the jacket 330 when wrapping the jacket 330 about the insulation substrate 320. In this example, a release layer may be initially attached to the securement area 332 before being pulled off to expose the adhesive. However, in other embodiments, there may be no securement area and, instead, the jacket may be secured about the insulation substrate 320 through other securing elements (e.g., zip ties, adhesive, wire ties, tape, wrapping, or the like). In other embodiments, the securement area may be a cohesive such that the securement area may couple with a corresponding cohesive along a different portion of the jacket to secure the jacket to the insulation substrate. The securement area 332 may run a full length of the jacket 330, however, in other embodiments, the securement area may run less than a full length of the jacket. In other embodiments, the securement area may be positioned along any portion of the jacket, such as along an intermediate portion of the jacket.

Turning to FIG. 3B, the jacket 330 may be secured about the insulation substrate 320 and the structure 310 to support the position and shape of the inflation substrate 320 about the structure 310. For example, the securement area 332 may be pressed against an outer surface of the jacket 330 to couple the jacket 330 to the insulation substrate 320. Once the insulation substrate 320 is coupled to the structure 310 and, if desired or needed, additional securement mechanisms (e.g., the jacket 330, zip ties, adhesive, wire ties, tape, wrapping, or the like) assists in securing the insulation 320 to the structure 310, the insulation substrate 320 may be left to cure in the ambient conditions surrounding the structure 310 until the insulation substrate 320 is cured.

However, in other embodiments, additional pressure or heat may be applied to the insulation substrate 320 to expedite the curing process.

III. Exemplary Method of Manufacturing an Insulation System

Figure 4:
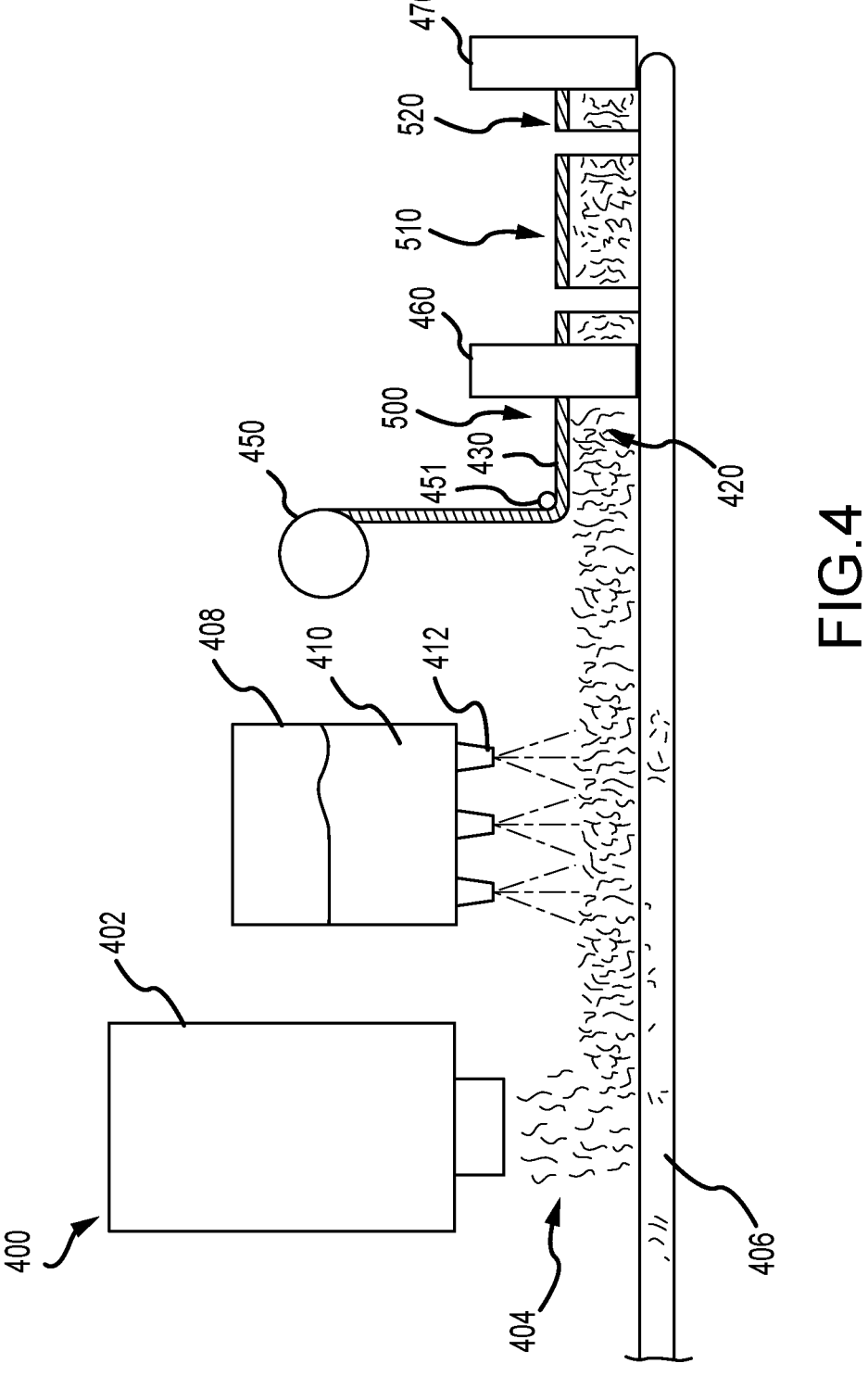
FIG. 4 illustrates a method of manufacturing an insulation system according to one embodiment of the disclosure.

FIG. 4 shows a simplified schematic of an exemplary fabrication system 400 for making an insulation substrate 420. It is understood that features ending in like reference numerals as features discussed above are similar, except as noted below. The system 400 includes fiber supply unit 402 that supplies the glass fibers for the insulation substrate 420. The fiber supply unit 402 may be filled with pre-made glass fibers, or may include equipment for making the glass fibers from starting materials (e.g., molten glass). The fiber supply unit 402 deposits the fibers 404 onto a porous conveyor belt 406 that transports the fibers under the binder supply unit 408. The belt 406 may be perforated and/or porous to allow excess binder composition 410 to pass through the belt 406 to a collection unit (not shown) below. The collection unit may include filters and circulation pumps to recycle at least a portion of the excess binder back to the binder supply unit 408.

The binder supply unit 408 contains an uncured binding element 410 (e.g., in a liquid form), that is deposited onto the fibers 404. In the embodiment shown, the binding element 410 is spray-coated onto the fibers 404 with spray nozzles 412, however, other application techniques (e.g., curtain coating, dip coating, knife coating, or the like) may be used in addition to (or in lieu of) the spray coating technique illustrated by nozzles 412.

The binding element 410 applied on fibers 404 forms an insulation substrate 420 on the top surface of the conveyor belt 406. In some embodiments, the insulation substrate may also be compressed prior to further steps in the formation process. For example, the insulation substrate may be compressed by passing under a plate (not shown) that tapers downward to decrease the vertical space available to the insulation substrate. The insulation substrate may emerge from under the plate in a compressed state with less thickness than when it first made contact with the plate. The taper angle formed between the plate and conveyor belt can be adjusted to adjust the level of compression placed on the insulation substrate.

In some embodiments, a jacket 430 may be coupled to the insulation substrate 420 to form an insulation system 500. The jacket 430 may be pulled from the jacket roll 450, which may be a roll of the jacket 430. The roller 451 may be a free-spinning roller for the jacket layer 430 to wrap around as the jacket 430 leaves the jacket roll 450 to be positioned on the insulation substrate 420. In this manner, the jacket 430 may be pulled out of the release layer roll 450 about the roller 451 to be coupled to the insulation substrate 420. The roller 451 may act to press the jacket 430 to the insulation substrate 420, however, in other embodiments, there may be a separate means of applying pressure to couple the jacket 430 to the insulation substrate 420 (e.g., a plate, separate roller, or the like).

Where the jacket 430 is corrugated, there may be minimal pressure applied against the jacket 430 to couple the jacket 430 to the insulation substrate 420 as the insulation substrate 420 to avoid flattening out the corrugated geometry. As the insulation substrate 420 is uncured and tacky, the jacket 430 may adhere to the insulation substrate 420 with minimal pressure. In an alternative embodiment, there may be no pressure applied against the jacket to couple the jacket to the insulation substrate.

In other embodiments, a release layer (e.g., the release layer 340) may be coupled to the insulation substrate to additionally form the insulation system 500. Where a jacket is coupled to the insulation substrate, the release layer may be pulled from a roll and coupled to a surface of the insulation substrate opposite the surface of the insulation substrate that is coupled to the jacket. For example, the release layer may first be pulled from a roll to lay down on the belt prior to the formation of the insulation substrate. However, in other embodiments, there may be no release layer coupled to the jacket.

Once the insulation system 500 is formed, the insulation system 500 may be fed along the belt 406 into a cutting mechanism 460 to cut the insulation system 500 into separate sections. The cutting mechanism 460 may be any means of separating the insulation system 500, including cutting using one or more sharp blades, tearing, or the like. Accordingly, the cutting mechanism 460 may cut the insulation system 500 into individual sections of the insulation system sections 510, 520. The cutting mechanism 460 may additionally including a perforation mechanism to form perforations along a portion of the insulation system sections 510, 520 (e.g., along a length or width of the insulation system sections 510, 520) to allow for portions of the insulation system sections 510, 520 to be later separated from each other.

Once the separate insulation system sections 510, 520 are formed, the belt 406 may feed the insulation system sections 510, 520 into a packaging mechanism 470 to package the insulation system sections 510, 520 into for transportation. The insulation system sections 510, 520 may be packaged as a packaged product in an uncured state. This packaging mechanism 470 may include rolling the insulation system sections 510, 520 as a roll. In other embodiments, the packaging mechanism 470 may stack one or more of the insulation system sections 510, 520 to form a stack. Other means of packaging the insulation system sections 510, 520 may be used to package the insulation system sections 510, 520 for transportation.

In some embodiments, there may be neither jacket nor release layer coupled with the insulation substrate. In this example, the insulation substrate, by itself, may be cut and packaged for transportation.

Although the above description is directed mostly to pipes used in plumbing, it is understood that the insulation of the present disclosure may be directed to other uses, such as for roofing, appliances, automotive, or the like.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

What is claimed is:

1. A method of insulating a piping system comprising:
coupling an uncured insulation substrate to the piping system;
securing the uncured insulation substrate to the piping system with a jacket by adhering an end of the jacket to a surface of the jacket; and
setting the uncured insulation substrate to cure the uncured insulation substrate to a cured insulation substrate.

2. The method of claim 1, wherein the jacket includes a corrugated geometry.

3. The method of claim 1, wherein coupling the uncured insulation substrate to the piping system includes wrapping the uncured insulation substrate to the piping system.

4. The method of claim 1, wherein coupling the uncured insulation substrate to the piping system includes adhering the uncured insulation substrate to the piping system.

5. The method of claim 1, wherein setting the uncured insulation substrate includes setting the uncured insulation substrate at ambient conditions.

6. The method of claim 1, further comprising, prior to coupling the uncured insulation substrate to the piping system, peeling off a release layer from the uncured insulation substrate.

7. A method of insulating a piping system comprising:
coupling an uncured insulation substrate to the piping system;
securing the uncured substrate to the piping system with a jacket having a corrugated geometry; and setting the uncured insulation substrate to cure the uncured insulation substrate to a cured insulation substrate.

8. The method of claim 7, wherein securing the jacket to the insulation substrate includes coupling an end of the jacket to a surface of the jacket.

9. The method of claim 7, wherein coupling the uncured insulation substrate to the piping system includes adhering the uncured insulation substrate to the piping system.

10. The method of claim 7, wherein setting the uncured insulation substrate includes setting the uncured insulation substrate at ambient conditions.

11. The method of claim 7, further comprising, prior to coupling the uncured insulation substrate to the piping system, peeling off a release layer from the uncured insulation substrate.

12. A method of insulating a piping system comprising:
peeling off a release layer from an uncured insulation substrate;
after peeling off the release layer, coupling the uncured insulation substrate to the piping system; and
setting the uncured insulation substrate to cure the uncured insulation substrate to a cured insulation substrate.

13. The method of claim 12, further comprising securing the uncured substrate to the piping system with a jacket, a zip tie, adhesive, wire tie, or tape.

14. The method of claim 13, wherein securing the uncured substrate includes securing the jack to the uncured substrate with an additional securing element.

15. The method of claim 14, wherein the additional securing element includes at least one of a zip tie, adhesive, wire tie, or tape.

16. The method of claim 13, wherein the jacket includes a corrugated geometry.

17. The method of claim 12, wherein coupling the uncured insulation substrate to the piping system includes wrapping the uncured insulation substrate to the piping system.

18. The method of claim 12, wherein coupling the uncured insulation substrate to the piping system includes adhering the uncured insulation substrate to the piping system.

19. The method of claim 12, wherein setting the uncured insulation substrate includes setting the uncured insulation substrate at ambient conditions.

* * * * *